United States Patent
McBride

(10) Patent No.: US 8,636,306 B2
(45) Date of Patent: Jan. 28, 2014

(54) SKATE BOARD PADDLE

(75) Inventor: Stephen L. McBride, North Ogden, UT (US)

(73) Assignee: Stephen L. McBride, North Ogden, UT (US)

( * ) Notice: Subject to any disclaimer, the term of this patent is extended or adjusted under 35 U.S.C. 154(b) by 243 days.

(21) Appl. No.: 13/066,772

(22) Filed: Apr. 25, 2011

(65) Prior Publication Data

US 2012/0267872 A1 Oct. 25, 2012

(51) Int. Cl.
  *B62M 29/00* (2006.01)
(52) U.S. Cl.
  USPC ............................................. 280/821; 135/77
(58) Field of Classification Search
  CPC ...................................................... B62M 29/00
  USPC .............. 280/219, 819, 821, 824, 826; 440/6; 29/525.02; 473/508, 559, 560, 561, 473/562, 563; 135/77, 86
  See application file for complete search history.

(56) References Cited

U.S. PATENT DOCUMENTS

| | | | | |
|---|---|---|---|---|
| 3,301,268 A * | 1/1967 | Tryon | | 135/69 |
| 3,797,845 A * | 3/1974 | Kepka et al. | | 280/822 |
| 4,222,562 A * | 9/1980 | Gardner | | 273/129 K |
| 4,269,056 A * | 5/1981 | Kozinski | | 72/459 |
| 4,303,402 A * | 12/1981 | Gooding | | 440/101 |
| 4,488,721 A * | 12/1984 | Franck et al. | | 473/563 |
| 4,493,334 A * | 1/1985 | Semanchik et al. | | 135/75 |
| 4,899,771 A * | 2/1990 | Wilkinson | | 135/77 |
| 5,103,850 A * | 4/1992 | Davis | | 135/84 |
| 5,236,222 A * | 8/1993 | Fletcher | | 280/809 |
| 5,301,704 A * | 4/1994 | Brown | | 135/78 |
| 5,331,989 A * | 7/1994 | Stephens | | 135/65 |
| 5,353,825 A * | 10/1994 | Davis | | 135/78 |
| 5,392,801 A * | 2/1995 | Hannoosh et al. | | 135/65 |
| 5,409,029 A * | 4/1995 | Davis | | 135/68 |
| 5,411,045 A * | 5/1995 | Davis | | 135/83 |
| 5,458,145 A * | 10/1995 | Davis | | 135/68 |
| 5,465,745 A * | 11/1995 | Davis | | 135/82 |
| 5,653,468 A * | 8/1997 | Ostapyk | | 280/809 |
| 5,674,141 A * | 10/1997 | Laforest | | 473/559 |
| 5,713,382 A * | 2/1998 | Midcap | | 135/84 |
| 5,829,463 A * | 11/1998 | Galan | | 135/77 |
| 5,930,835 A * | 8/1999 | Silvestri | | 2/16 |
| 5,954,075 A * | 9/1999 | Gilmour | | 135/84 |
| 6,003,533 A * | 12/1999 | Midcap | | 135/84 |
| 6,206,793 B1 * | 3/2001 | Burger | | 473/561 |

(Continued)

*Primary Examiner* — Katy M Ebner
*Assistant Examiner* — Brodie Follman

(57) ABSTRACT

A street paddle which permits a user of an associated skateboard of similar devise to smoothly stroke with two hands and arms and upper body, rather than using their foot to accelerate or decelerate is disclosed. The street paddle is unique in that is allows a skateboard rider to pull and push their way on the street to accelerate, similar to a stand up paddlers or canoe paddlers on the water. A contact point, blade footing of the street paddle, where the paddle device comes in contact with the ground, connects to the bottom of an elongated shaft of the paddle. The footing comprises form and material that facilitates traction, when applied against a traveled surface, as well as shock dampening action to assist in smoothness and acceleration. As such, the street paddle may also be used to decelerate the speed by dragging the footing on the ground in such a way that the friction of the contact slows the skateboard. The footing comprises a hook-shaped element to permit a user to grab park and other path-side features for the purpose of performing tricks.

1 Claim, 3 Drawing Sheets

(56) References Cited

U.S. PATENT DOCUMENTS

| | | | |
|---|---|---|---|
| 6,217,073 B1* | 4/2001 | Hoffman | 280/823 |
| 6,325,732 B1* | 12/2001 | Ankeny | 473/559 |
| 6,374,841 B1* | 4/2002 | Yamamoto et al. | 135/77 |
| 6,802,482 B2* | 10/2004 | Harris | 248/188.9 |
| 6,961,967 B1* | 11/2005 | Brown | 5/81.1 R |
| 7,686,025 B1* | 3/2010 | Dowling | 135/66 |
| 7,757,537 B1* | 7/2010 | Hartranft | 72/458 |
| 7,802,581 B2* | 9/2010 | Heim | 135/86 |
| 7,833,117 B2* | 11/2010 | Tiura | 473/550 |
| 7,926,849 B2* | 4/2011 | Lenhart | 280/824 |
| 8,166,989 B2* | 5/2012 | Heim | 135/78 |
| D661,759 S * | 6/2012 | Calawerts | D21/776 |
| 2003/0226585 A1* | 12/2003 | Burchel | 135/77 |
| 2004/0007865 A1* | 1/2004 | Rosnell | 280/819 |
| 2004/0066016 A1* | 4/2004 | Raikin | 280/219 |
| 2004/0226593 A1* | 11/2004 | Robitaille et al. | 135/77 |
| 2008/0196753 A1* | 8/2008 | Heim | 135/78 |
| 2009/0236816 A1* | 9/2009 | McBride | 280/219 |
| 2009/0288693 A1* | 11/2009 | Lasota | 135/86 |
| 2009/0314320 A1* | 12/2009 | Heim | 135/82 |
| 2010/0229903 A1* | 9/2010 | Ozuna et al. | 135/73 |
| 2010/0234146 A1* | 9/2010 | Mullin | 473/517 |
| 2011/0084472 A1* | 4/2011 | Karlof et al. | 280/824 |
| 2011/0101664 A1* | 5/2011 | Gonzalez et al. | 280/821 |
| 2011/0175338 A1* | 7/2011 | Senseman | 280/821 |
| 2011/0187091 A1* | 8/2011 | Nickaes | 280/821 |
| 2011/0187092 A1* | 8/2011 | Nickaes | 280/824 |
| 2011/0223816 A1* | 9/2011 | Boukas | 440/6 |
| 2012/0049502 A1* | 3/2012 | Ascunce | 280/821 |
| 2012/0139224 A1* | 6/2012 | Weir et al. | 280/821 |
| 2012/0200073 A1* | 8/2012 | Bennett | 280/819 |
| 2012/0326425 A1* | 12/2012 | Cubillo | 280/819 |
| 2013/0035010 A1* | 2/2013 | Boukas | 440/6 |
| 2013/0074893 A1* | 3/2013 | Palmer | 135/68 |

* cited by examiner

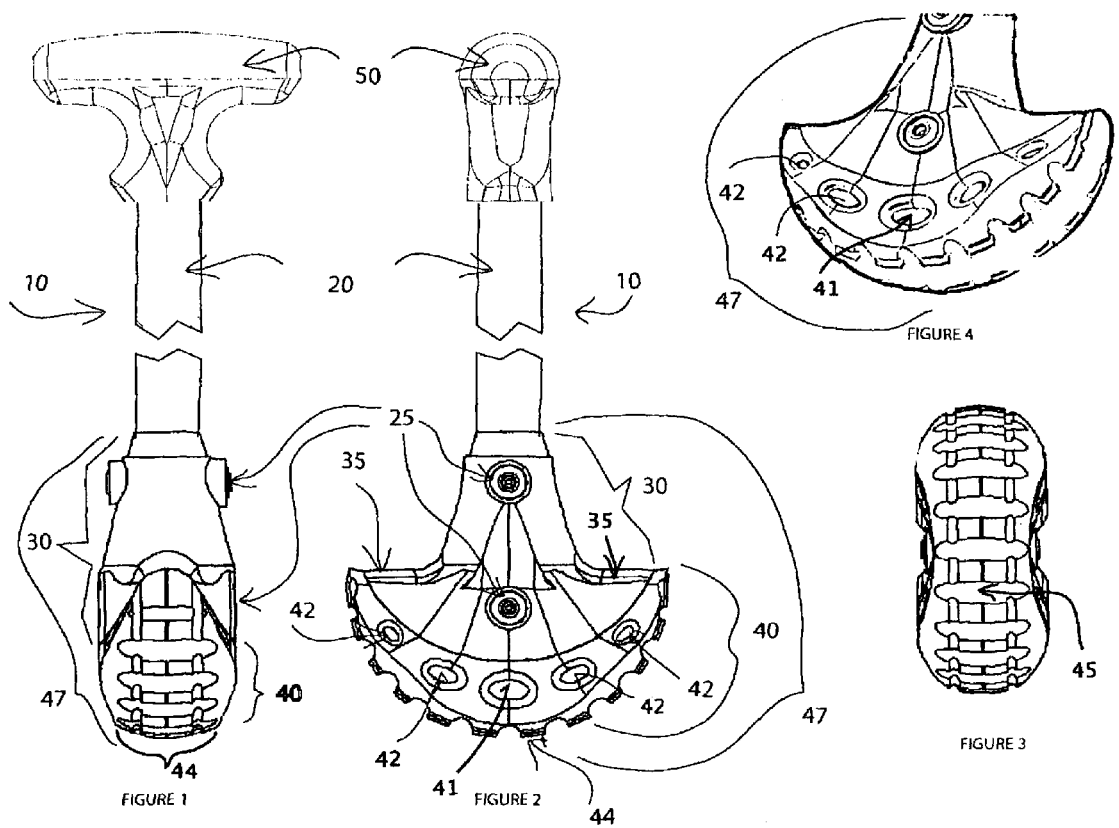

SKATE BOARD PADDLE

FIELD OF INVENTION

The instant invention disclosed herein relates to skate boards and skate boarding and is more particularly related to a skate board paddles with a unique blades to increase safety, efficacy and mobility when operating a skate board on land.

DESCRIPTION OF RELATED ART

From nearly the beginning of time there has been the use of a paddle to propel a water vessel across water. A paddle typically consists of a handle located at the top end of a supportive shaft and a blade located at the bottom end of a shaft. A person holds a paddle with both hands, with one hand on the top handle and the other hand near the middle of a shaft, providing the force necessary to propel a water vessel. The paddling motion generated by a user with a two handed grip efficiently and forcefully pushes water against a blade, producing an opposite forward force, propelling a water vessel in a certain direction.

Currently, there is no skate board paddle developed specifically for skate board use known to the inventors of the presently disclosed invention. Skate boards are propelled by placing one foot on the skate board and "pushing" the skate board with the opposite foot providing acceleration of the skate board. In order to slow a skate board, a user must either drag its foot, jump off a skate board or create drag by turning a skate board.

The problem with pushing a skate board by one's foot is three-fold; 1) fatigue sets in quickly because of the constant pushing of one's foot and could cause loss of control, 2) the body may be thrown out of natural alignment because of the constant pushing of one foot on the road while the other foot maintains balance on a skate board and 3) maintaining a secure balance with one leg being on the skate board and the other leg being used for only ground contact is difficult.
Definitions Blade—A unique non-rotating, land surface grip device located on the bottom end of a supportive shaft of a skate board paddle, designed to assist a user to control, propel and decelerate a wheeled device similar to using a water-based paddle on land. Said blade consists of a combination of a rubber land surface footing and a hard, light-weight housing. Said blade housing securely houses said footing. Said footing has an undulating shaped curved tread of varying width and an undulating shape of its sidewalls and a tread path spanning an arc greater than 120 degrees. Further, said footing has varying height, width and length holes due to the undulating shape of its sidewalls used to dampen pressure forces exerted on said blade.

Hook—A hook is an element of said blade designed for the purpose of 1) grabbing various objects such as a road, curb or other such objects to slow down a user on a skate board; 2) holding a skate board against the body as a user performs an aerial trick and 3) grabbing a skate board park feature for the enjoyment of a user.

Undulating—A wavelike design with varying widths of said blade that provides an efficient ergonomic structure to allow a user of said skate board paddle to utilize said stroke path sufficient to propel a skate board forward in a smooth, wavelike motion to maximize said skate board paddle leverage throughout a skate board paddle stroke path.

Stroke Path—A path of contact points on the bottom surface of said blade as it makes contact with a land surface during said skate board paddle stroke path by a user. The maximum stroke path is an arc greater than 120 degrees.

Dampening Holes—A feature of said blade that allows a dampening response to the pressure applied to said skate board paddle by a user as said blade travels through said stroke path. Dampening holes have different sized and shaped holes located in said footing part of said blade to provide resiliency within said blade easing contact shock associated with paddling on a land surface. The height, width and length of said dampening holes vary depending on the location of said dampening holes on said footing.

Durometer—A measurement of the hardness/softness of an object. The higher the durometer measurement, the harder the object's composition.

Jigsaw Bond—Similar to a jigsaw puzzle, a Jigsaw Bond allows two dissimilar objects to bond together in an interlocking manner.

Fused Bond—A covalent bond that melts two dissimilar objects with dissimilar composition together for a permanent connection.

Cavity Mold—A molding method that allows a compound to be injected molded into a cast that provides cavities throughout the object. The purpose of cavity molding is to reduce overall weight and reduce material volume.

BRIEF SUMMARY AND OBJECTS OF THE INVENTION

In brief summary, this novel skate board paddle invention gives a user of a skate board or any similar wheeled device, such as a caster board, the ability to significantly propel the user on a skate board due to the unique design of said blade. Generally, a two handed grip is the preferred user methodology, similar to the method one uses to paddle a canoe.

Said skate board paddle consists of a handgrip located at the top of a supportive shaft and a specialized blade, located at the bottom of said skate board paddle. Said shaft may be constructed of wood, fiberglass, aluminum or other materials, which meet weight, strength and performance objectives. On the top end of said shaft of various or adjustable lengths and grasping modes to accommodate for the height of a particular user, positioned as a "T" grip for the hand, is a handle constructed perpendicular to said shaft, allowing for gripping and positioning by one of a user's hands.

Located at the bottom end of said shaft is said blade designed to provide a contact point between a land surface, such as a riding path, or road and said skate board paddle. Said contact point is designed to permit said skate board paddle to grip a land surface so that said footing connects with a land surface in an efficient manner. This allows said blade to maximize the ergonomic affect of a user paddling on a land surface by following the natural contour of the stroking motion against a land surface as well as provide maximum leverage by a user of said skate board paddle.

Additionally, said blade is fixed relative to said shaft for a more secure contact point with a land surface and is designed to provide shock absorption capabilities. A molded combination of a polycarbonate housing fused to a molded durable rubber footing may be used for such purposes.

Said blade is designed to be securely affixed to said shaft. Said blade comprises a fixed polycarbonate exoskeleton structure to provide a strong and durable housing and said rubber molded footing. Said footing is connected to said housing by a jigsaw puzzle type connection as well as being fuse bonded to the exoskeleton housing. Said footing is designed to provide a smooth undulating curvature allowing said stroke path to follow the contour of a land surface.

Said blade is also designed to provide a softening or dampening effect for a user to experience a smooth motion while paddling as well as provide an energy return effect for a user to experience added thrust as a result of stroke by a user. The design of said skate board paddle also allows a user to apply forces against a land surface to slow down the momentum of a skateboard.

Said blade is also designed to provide a "hooking" mechanism to allow advanced maneuvers such as changing direction board control and similar tricks. Hooking is accomplished by placing the hook part of said blade on the side of a skateboard, or similar device, as well as various surfaces and elements. Said hook element of said Blade can be used to grab or hold said blade firmly on to these objects. Said blade is also designed to provide added dampening and energy return functionality for added comfort and assistance to a user. Added dampening and energy return is accomplished by molding said dampening holes directly within said footing when a user applies force on said paddle against a land surface. Said dampening holes compress when force is applied, which dampens the blow of a force of said footing thrust against a land surface. Energy return is accomplished when said dampening holes are decompressed against a land surface. A force is exerted against said blade as said dampening holes are decompressing, providing a spring-like motion to assist a user in propulsion.

A primary objective of said skate board paddle is to provide an alternative mode of controlling a skate board without relying entirely upon the action of a user's foot.

In addition, said skate board paddle has a unique high friction contact footing which adapts to variable land surface contours as well as an undulated, or wavelike, designed contact point providing leverage and thrust throughout an entire stroking motion.

Further, said skate board paddle, has a replaceable blade.

It is yet another object to provide said hook to allow a user to perform tricks and increased the effects of exercise and balance on a wheeled board using said skate board paddle to match a user's skill and physical characteristics.

It is another object to provide said curved treaded traction surface contact on said footing. Said footing has a gripping surface area on said blade with the land surface which minimizes said blade from slipping on said stroke path. Placement of said curved tread on said footing is important to prevent stroke path slippage from any angle while exerting a force against a land surface for acceleration or deceleration. Said curved tread must be placed in such a manner that a user's height is taken into consideration. Ideally said curved tread will have a vertical as well as horizontal curve to allow said blade to follow said stroke path properly. The combination of a vertical and horizontal curved tread shape is critical to provide the user with a maximum grip on a land surface, stability and comfort on said stroke path.

These and other objects and features of the present invention will be apparent from the detailed description taken with reference to accompanying drawings as shown in FIGS. 1-7.

BRIEF DESCRIPTION OF THE DRAWINGS

FIG. 1 is a front elevation view of a said skate board paddle made according to the present invention.
FIG. 2 is a side elevation view of said skate board paddle.
FIG. 3 is a bottom elevation view of said skate board blade.
FIG. 4 is a perspective view of said blade.

DETAILED DESCRIPTION OF THE ILLUSTRATED EMBODIMENTS

Figure 5:
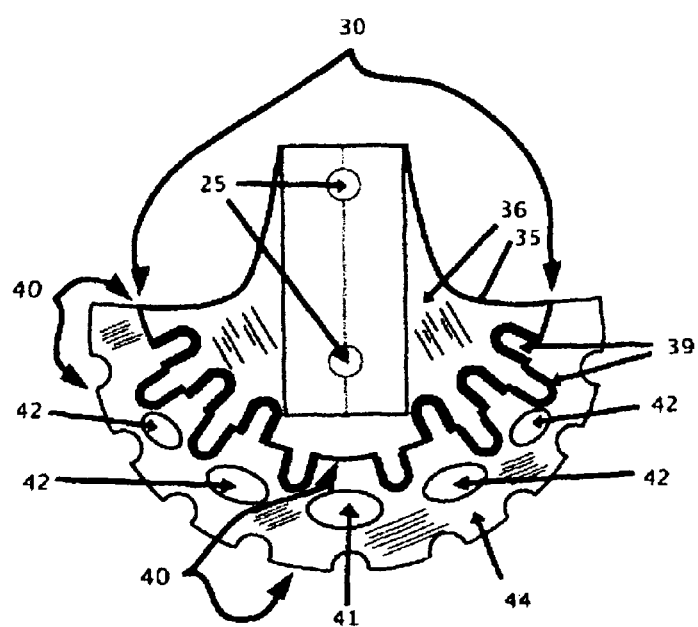
FIG. 5 is a cross section view of said blade.
Figure 6:
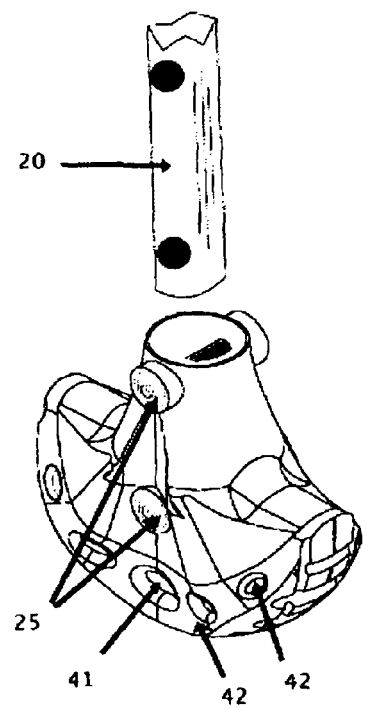
FIG. 6 is a perspective view of said blade.
Figure 7:
FIG. 7 is a user sketch of said skate board paddle in practice.

Reference is now made to the embodiments illustrated in FIGS. 1-7 wherein like numerals are used to designate like parts throughout. As seen in FIGS. 1 and 2, said skate board paddle 10 comprises said top located handle 50, said supporting shaft 20 and said bottom located blade 47 consisting of said polycarbonate support housing 30, and said footing 40 made of a fused, undulated, rubber compound. These parts are shown separately in cross section view in FIG. 5.

Said shaft 20 is sufficiently sturdy to withstand forces associated with a mature adult traveling at high velocities using said skate board paddle to decelerate or vary direction of travel on a skateboard. Said shaft may be constructed of wood, carbon fiber, fiberglass, polycarbonate, plastic, aluminum, or a composite material, which may be formed or molded, and generally be thin enough in circumference to be grasped by a user's hand, but thick enough to absorb stress loads without breaking.

Said paddle handle 50 is made of material that is readily mechanically or adhesively affixed to said shaft 20. Said paddle handle 50 provide a surface that is comfortably grasped with a user's hand. Said paddle handle 50 may be made of wood, carbon fiber, polycarbonate, rubber, plastic or composite material.

Said blade housing 30 is made of hardened material such as ballistic polycarbonate or metal that is fused or affixed to a said footing 40. Said blade housing 30 has a molded shaped hook 35, capable of withstand forces generated by grabbing on a land surface such as a solid skate park feature or a curb.

Said footing 40 is affixed to said blade housing 30 by a combination of jigsaw puzzle interlocks 39 in FIG. 5 and said interlock are fused by a chemical heating and melting process. Said blade housing 30 is cavity molded 36 FIG. 5 to reduce weight and cost. Said footing 40 has a curved side-to-side tread 44 in FIG. 1.

Further, the object of said footing 40 is to provide a resistive contact against said land surface impact area. Said footing 40 includes said dampening holes of varying height, width and depth as shown in FIGS. 2, 4, 5, and 6 placed within said footing 40 so the center hole 41 is aligned with the center line of said supportive shaft. The epicenter of said dampening holes are located on the same arc as the center hole 41, in FIGS. 2, 4, 5 and 6.

A durometer measurement of the elasticity of said footing 40 is such that the holes provide a dampening effect and energy return while a user is paddling. A preferred durometer reading is in the range of 60-70 for proper effectiveness to avoid the elasticity being either too hard to provide proper feel or too soft to limit performance.

Said blade 47 is affixed to said shaft 20 preferably by nuts and bolts 25 and tightened to make the connection immovable. Said blade 47 is affixed and oriented symmetrical to said shaft 20 and is located perpendicular to said handle 50.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A skate board paddle comprising:

a blade located at the bottom of said skate board paddle that grips a land surface allowing a user to propel and control a skate board;

a shaft to translate forces generated by a user to said blade to propel and control a skate board; and a handle to enable a user to apply leverage to said skate board paddle creating a force through said shaft to the blade to propel and control the skate board;

wherein said blade further comprises a footing and a housing; wherein said footing is a part of said skate board paddle that directly connects said skate board paddle with a land surface; wherein said footing has an undulating curved shaped tread of varying width and undulating shaped sidewalls with a tread path spanning an arc greater than 120 degrees; wherein said housing encases said blade, is rigidly connected to said shaft and enhances the strength and durability of said blade; wherein an integral element of said blade is a hook shape design of said footing enabling a user to perform tricks and provide a secure contact of said skate board paddle with a land surface while braking and maneuvering said skate board;

wherein said footing further comprises dampening holes to dampen pressure forces exerted on said blade; wherein said dampening holes have varying depth between each sidewall due to the undulating shape of said sidewalls; wherein said dampening holes enhance said skate board paddle stroking mechanics by a user when said footing contacts a land surface under pressure.

* * * * *